US012628860B2

(12) United States Patent
    Stamper

(10) Patent No.: US 12,628,860 B2
(45) Date of Patent: May 19, 2026

(54) COOKIE CUTTER ALIGNMENT JIG

(71) Applicant: Brown Box Cookie Cutters, LLC,
    Boise, ID (US)

(72) Inventor: Monica Stamper, Boise, ID (US)

(73) Assignee: Brown Box Cookie Cutters, LLC,
    Boise, ID (US)

( * ) Notice: Subject to any disclaimer, the term of this
    patent is extended or adjusted under 35
    U.S.C. 154(b) by 321 days.

(21) Appl. No.: 18/411,631

(22) Filed: Jan. 12, 2024

(65) Prior Publication Data
    US 2024/0407421 A1      Dec. 12, 2024

Related U.S. Application Data

(60) Provisional application No. 63/479,584, filed on Jan.
    12, 2023.

(51) Int. Cl.
    A23P 20/25          (2016.01)
(52) U.S. Cl.
    CPC ......... A23P 20/25 (2016.08); *A23P 2020/253*
                                              (2016.08)
(58) Field of Classification Search
    CPC ........ A21C 9/04; A21C 15/002; A21D 13/20;
              A23G 9/04; A23L 5/40; A23P 20/25;
              A23P 2020/253; B41K 3/02; B41K 3/04;
              B41K 3/24; B41K 3/44; B41K 3/46;
              B41K 3/54; B41K 3/62
    See application file for complete search history.

(56) References Cited

U.S. PATENT DOCUMENTS

| | | | |
|---|---|---|---|
| 11,794,483 B2 | 10/2023 | Cummins et al. | |
| 12,389,925 B2 | 8/2025 | Bowman et al. | |
| 2017/0079474 A1 * | 3/2017 | Stephen ................. | A23P 30/10 |
| 2023/0219710 A1 * | 7/2023 | Bowman ................. | A23P 20/15 |
| | | | 220/573.1 |

FOREIGN PATENT DOCUMENTS

KR        20240146440 A   * 10/2024   ............. B33Y 50/02

* cited by examiner

*Primary Examiner* — Christopher E Mahoney
*Assistant Examiner* — Marissa Ferguson-Samreth
(74) *Attorney, Agent, or Firm* — McCarter & English
LLP

(57) ABSTRACT

A print jig is provided to align a food product to be printed
upon by a printer, such as an edible ink printer. The print jig
can be a common shape, such as a circle or a square, or be
of an irregular shape, such as a spaceship or a butterfly. The
print jig fits onto a base plate via a lip of the print jig. A food
product is placed in a cutout of the print jig and comes into
contact with the base plate. The shape of the cutout of the
print jig matches the shape of the food product. The food
product will then be held in place by the print jig during
printing operations. A tongue adapter is provided on the
bottom of the base plate to connect to a cookie platform of
the printer snugly.

18 Claims, 18 Drawing Sheets

10     14

22

20

30

30

10

30

50

30

10

20

30

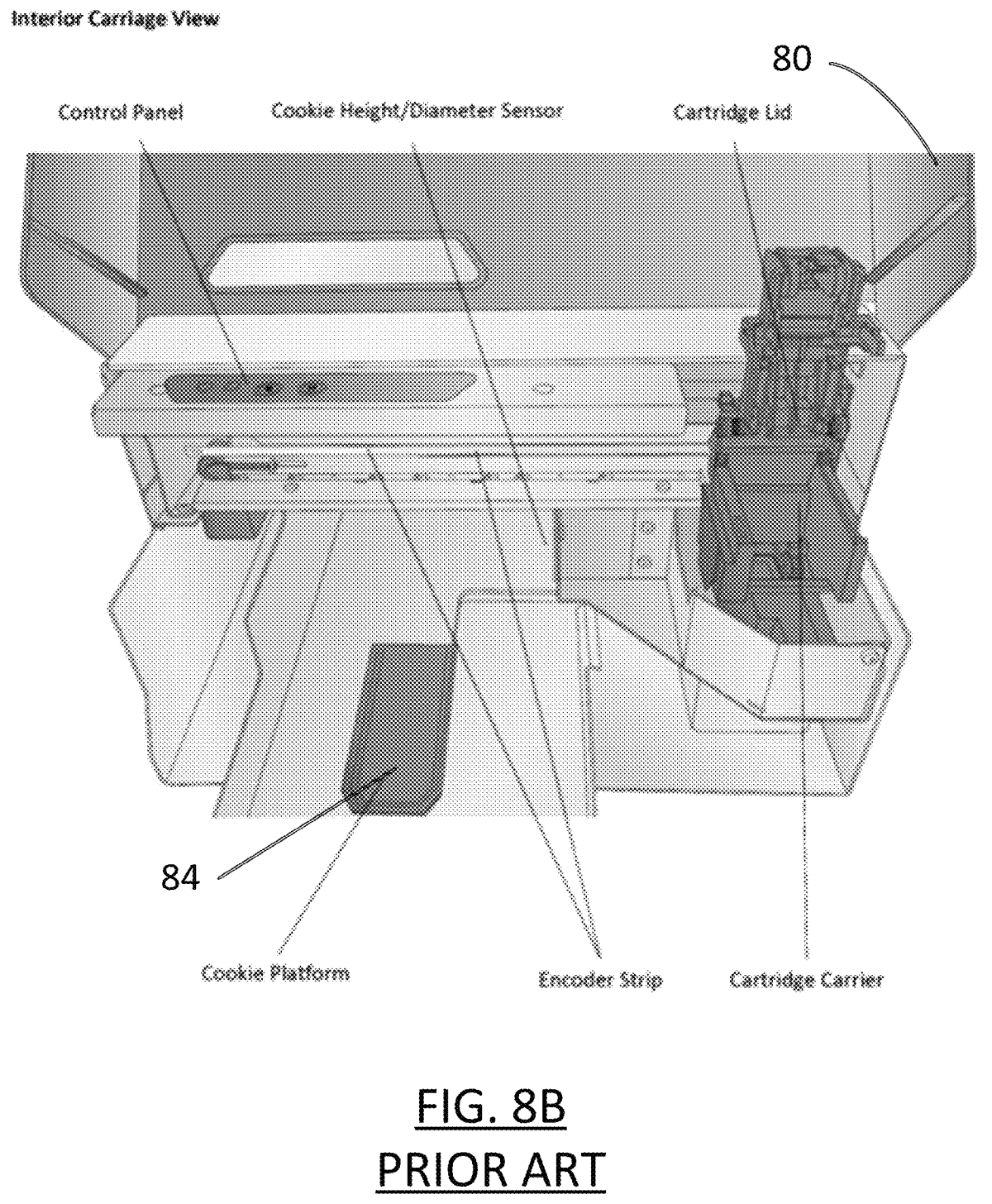

Interior Carriage View

80

Control Panel    Cookie Height/Diameter Sensor    Cartridge Lid

84

Cookie Platform    Encoder Strip    Cartridge Carrier

FIG. 8B
PRIOR ART

COOKIE CUTTER ALIGNMENT JIG

PRIORITY

This application claims benefit of U.S. Provisional 63/479,584 filed Jan. 12, 2023, which is hereby incorporated by reference in its entirety.

FIELD OF THE INVENTION

This disclosure relates generally to alignment jigs and more specifically to cookie cutter alignment jigs for edible ink printers.

BACKGROUND

Edible ink printers are used to print images onto the surface of food products, such as baked goods or other treats (e.g., cookies, macarons, bagels). As a food product is passed through the edible ink printer, edible ink is ejected onto the surface of the food product to print a design or image onto the food product. Typical edible ink printers include a print head having a series of nozzles for printing onto the surface of the food products. Food products can be conveyed underneath the print head on a tray mechanism either linearly (e.g., on a conveyor belt) or rotationally (e.g., on a carousel). A software application can be used to control operation of the edible ink printer to apply a decoration or image onto the food product. For successful printing, food products must conform with certain size specifications (e.g., 1.0"-2.0"×4.5"×8"). An exemplary edible ink printer is shown and described US Patent Application Publication 2021/0059291 A1, which is hereby incorporated by reference. An edible ink printer can print vibrant colors and photo-realistic photographs onto food products.

BRIEF DESCRIPTION OF THE DRAWINGS

FIGS. 8A and 8B show an exemplary edible ink printer of the prior art.

DETAILED DESCRIPTION

Figure 8A:
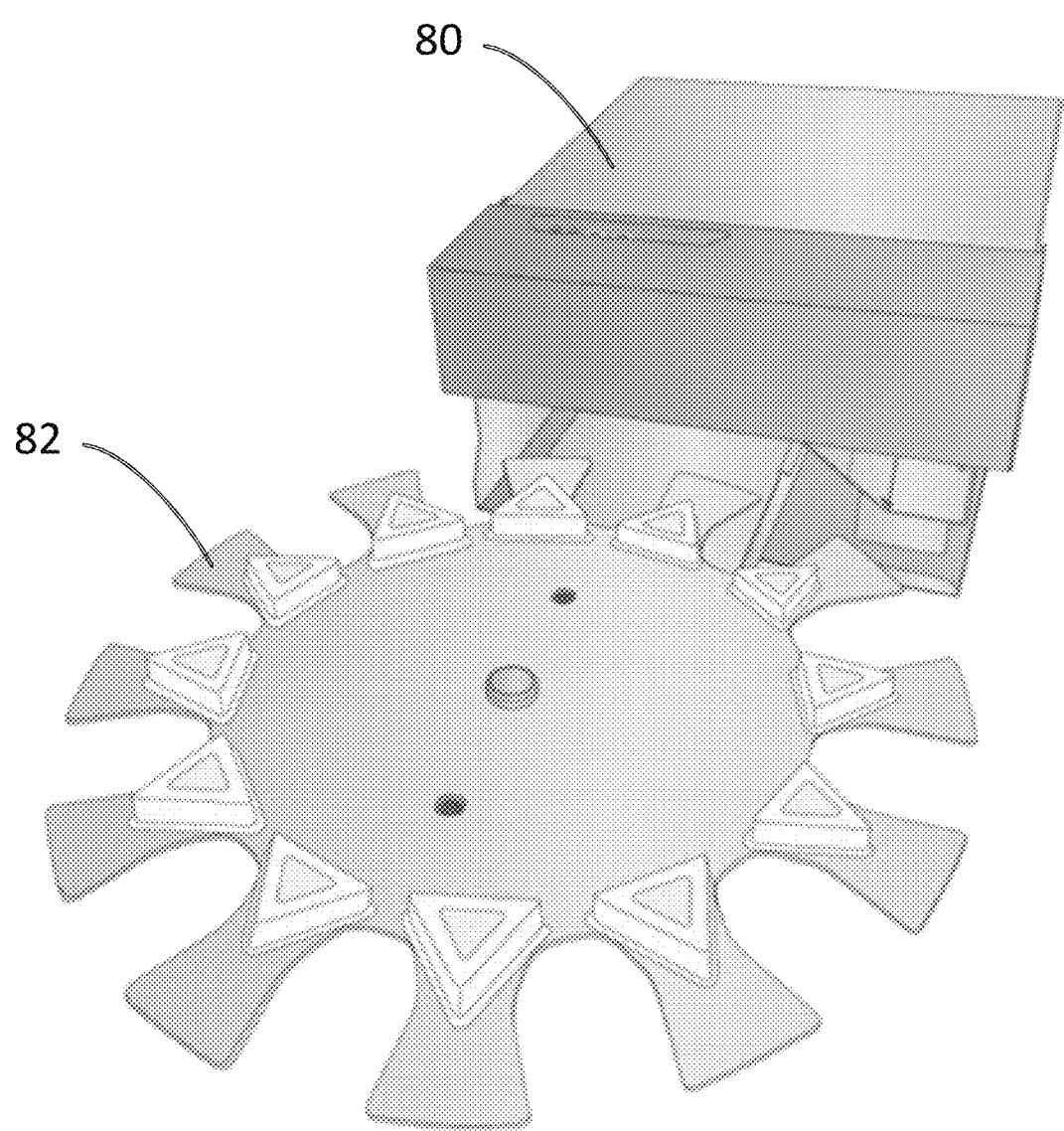

The detailed description is directed to various embodiments of a print jig assembly for providing alignment of a food product for printing. Printing may be performed, for example, by an edible ink printer. Edible ink is any type of ink that is deemed safe for human consumption including, but not limited to, food coloring, glycerin, sugar, or the like. A typical edible ink printer 80 is shown in FIGS. 8A and 8B. A food product, such as a cookie, may be fed into printer 80 via a carousel 82. Alternatively, a food product may be placed onto a platform, such as cookie platform 84 of FIG. 8B. Special care is required when placing a food product on the platform 84. For example, a cookie loaded for printing must be aligned in a specific manner to achieve a desired result. This becomes even more cumbersome when the cookie is of an irregular shape. For example, if the cookie was made with a cookie cutter in the shape of a flower or a car.

In embodiments of the present disclosure, a print jig assembly may be provided to align a food product to be printed upon by a printer, such as an edible ink printer shown in FIGS. 8A and 8B. The print jig assembly may include a series of components, such as a base plate 10 of FIG. 1 and a print jig 20 of FIG. 2. Additional components may be provided, such as a grip pad 30, a paper plate 50, and a practice cookie 70. In some embodiments, a print jig 20 may have a round 3.5" cut out portion for placement of a food product, such as a cookie. The cutout portion may vary in size (e.g., 2.5", 3", 3.5", etc.), based on the size of the food product for printing. Additionally, or alternatively, a practice cookie (e.g., a PhoDough cookie) may be provided for placement within the print jig 20.

Figure 1A:
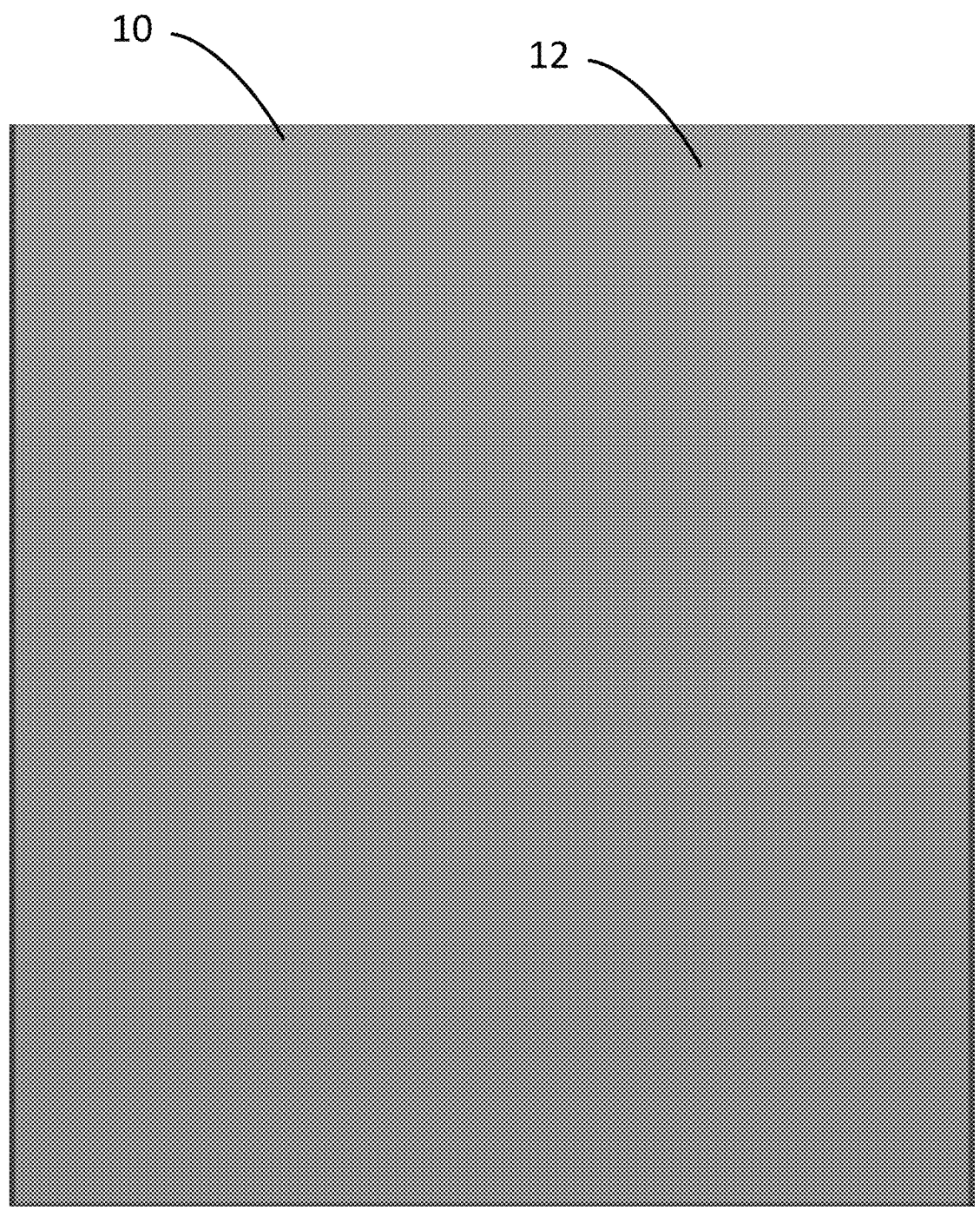
FIG. 1A shows a top view of an adapter base plate 10 according to at least one embodiment of the disclosure.
Figure 1B:
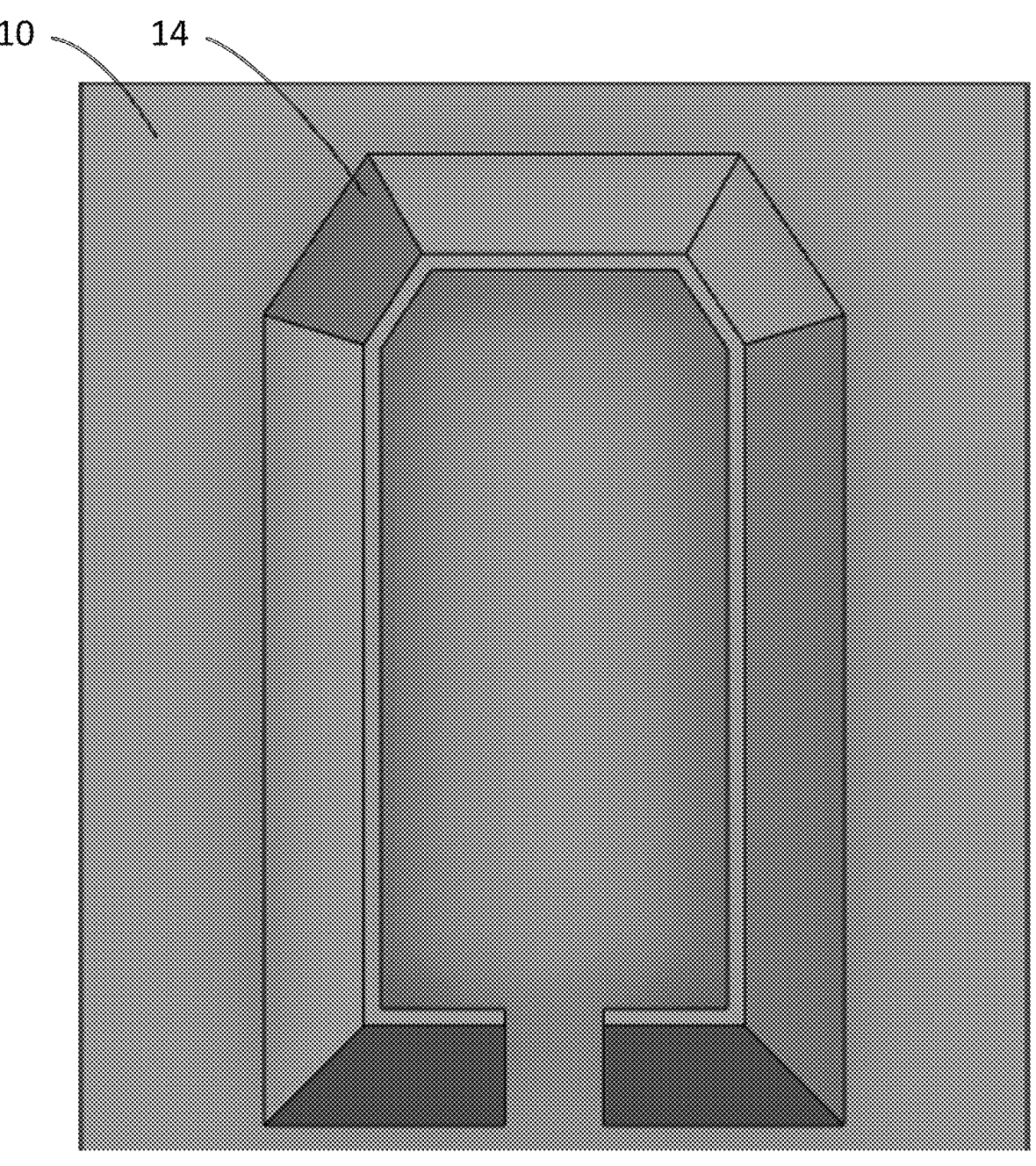
FIG. 1B shows a bottom view of an adapter base plate 10 according to at least one embodiment of the disclosure.
Figure 1C:
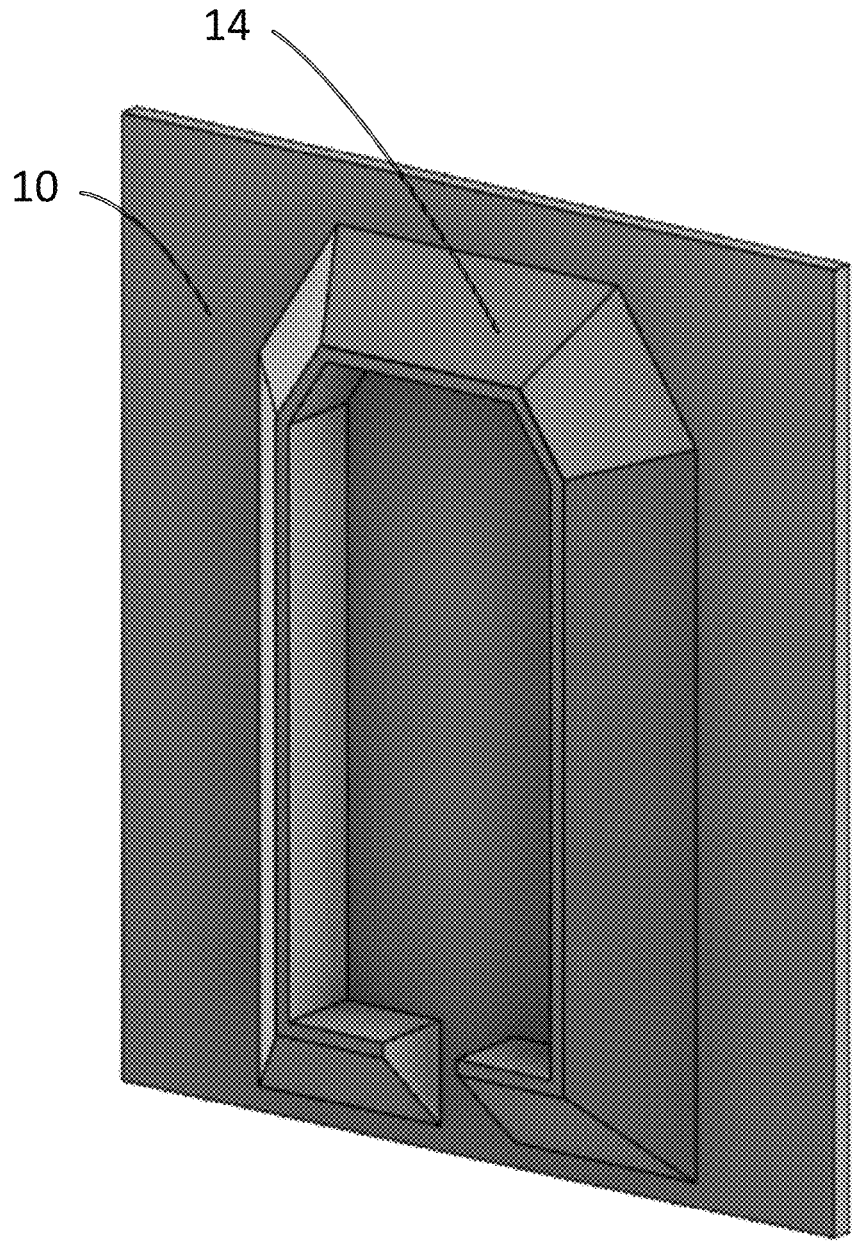
FIG. 1C shows a perspective view of an adapter base plate 10 according to at least one embodiment of the disclosure.

FIGS. 1A-1C illustrates multiple views of a base plate 10. As shown in FIG. 1A, the top of base plate 10 has a flat planar surface 12. On the underside of base plate 10, an adapter 14 is provided to attach the base plate to a portion of a printer. For example, via the adapter 14, the base plate 10 may be attached to a cookie platform 84 of FIG. 8B. Alternatively, adapter 14 may be shaped to attach to a carousel of the printer 80, such as carousel 82 of FIG. 8A. Base plate 10 may include reusable, washable, and food grade materials.

Figure 2A:
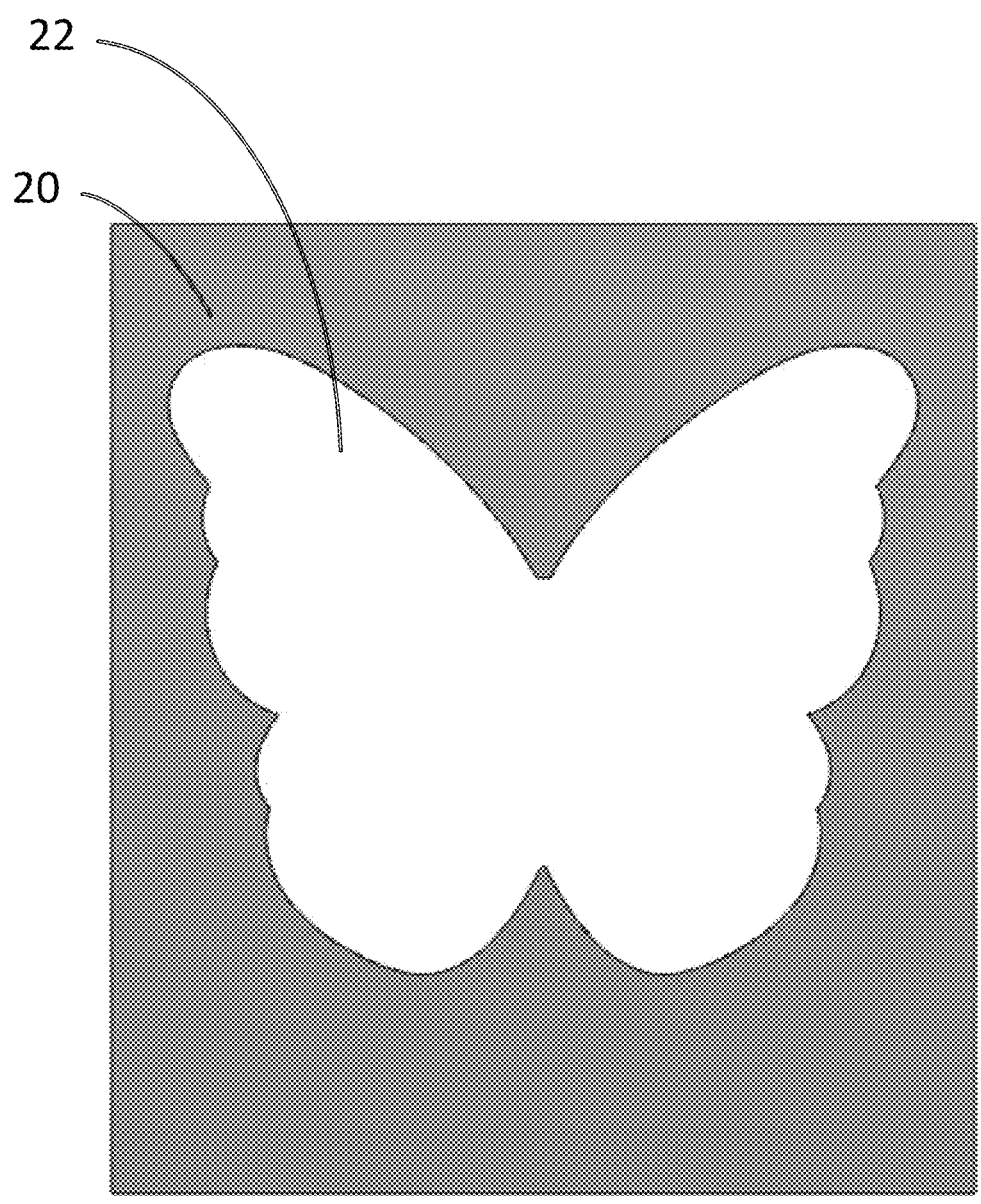
FIG. 2A shows a top view of a print jig 20 according to at least one embodiment of the disclosure.
Figure 2B:
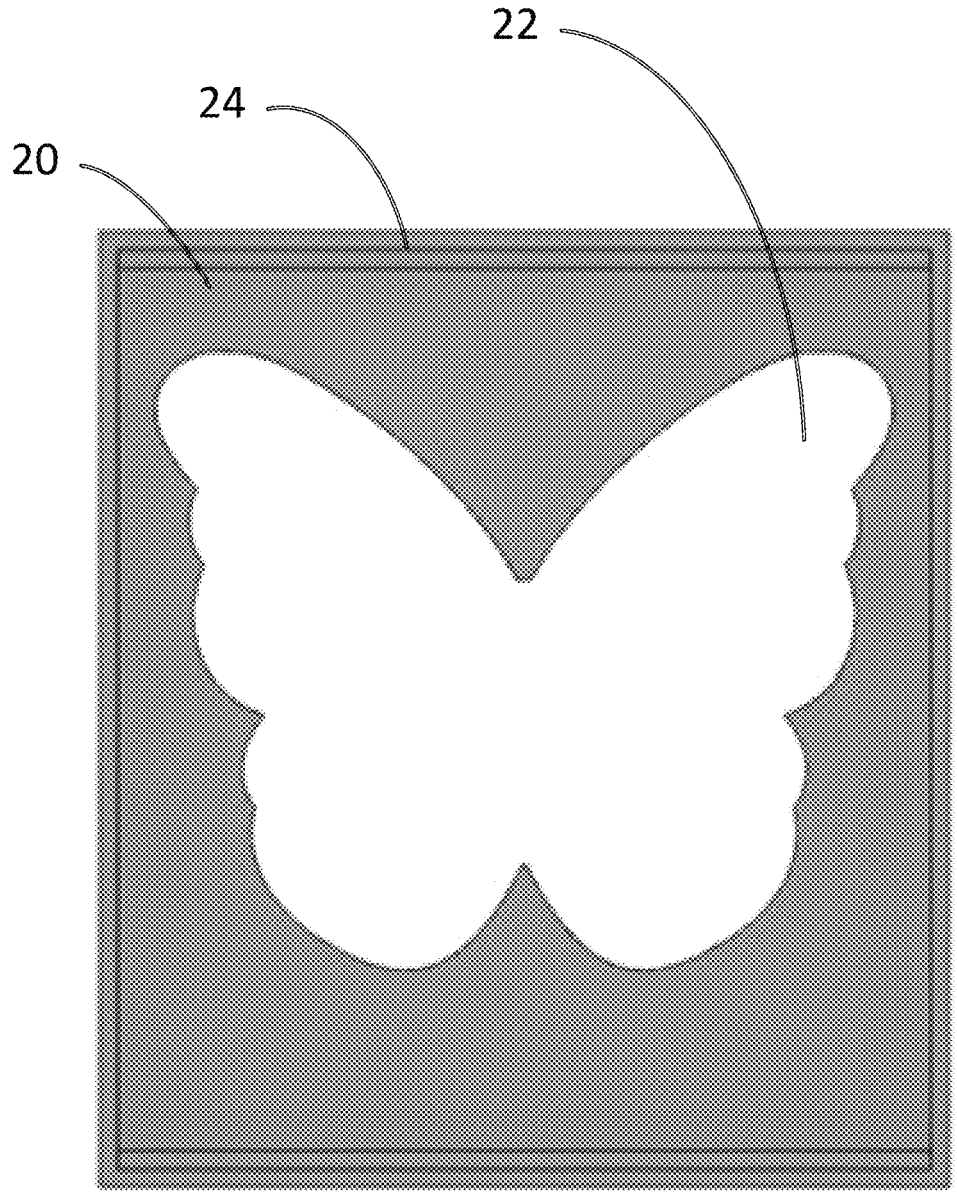
FIG. 2B shows a bottom view of a print jig 20 according to at least one embodiment of the disclosure.
Figure 2C:
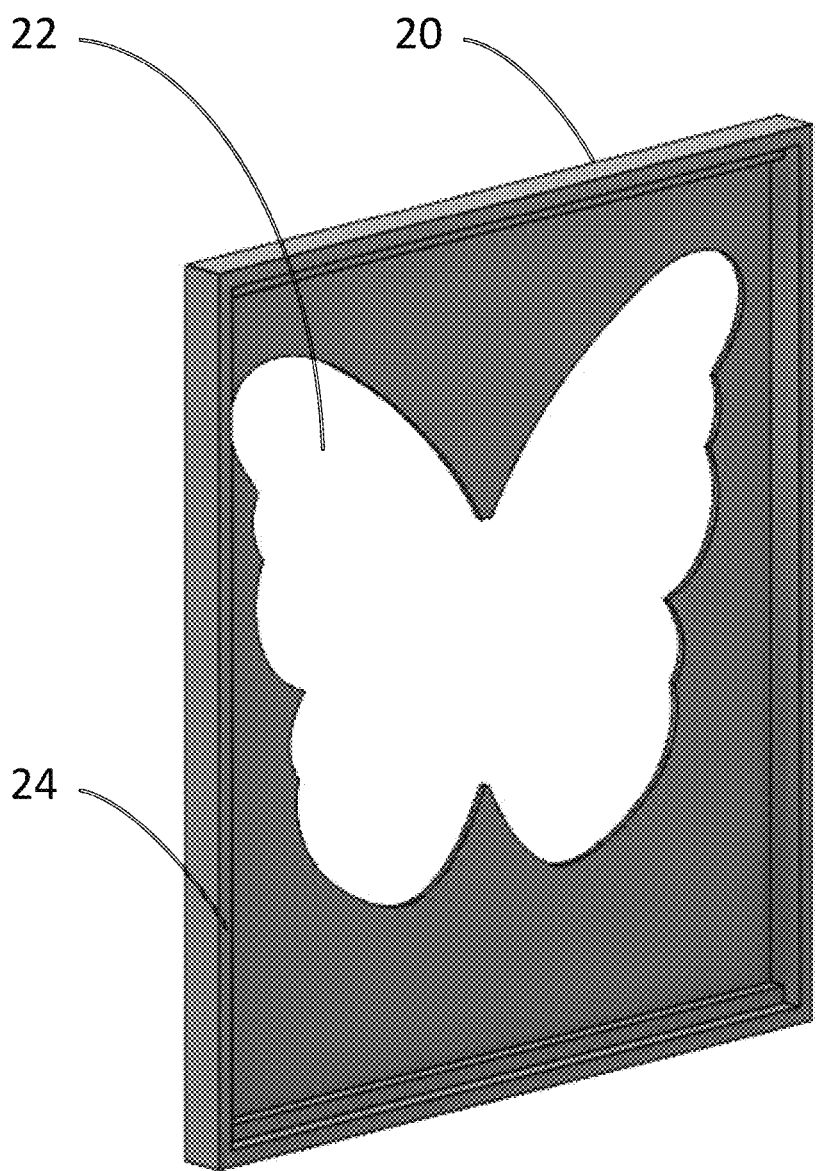
FIG. 2C shows a perspective view of a print jig 20 according to at least one embodiment of the disclosure.

FIGS. 2A-2C illustrate multiple views of a print jig 20. Print jig 20 may include a cutout portion 22. Cutout portion 22 may vary in shape. For example, while a butterfly shape is shown, the cutout portion may take on various shapes, such as a car, a spaceship, a toothbrush, or the like. The cutout portion 22 is not limited to any certain shape. In some embodiments, the cutout portion 22 shape may correspond to a cookie cutter shape. The cookie cutter may be used, for example, to cut a food product so that the food product will fit inside the print jig. For example, a cookie cutter in the shape of a butterfly would have similar dimensions to a print jig in the shape of a butterfly. Cutout portion 22 may be approximately 3.5 inches wide. The underside of print jig 20 may include a lip portion 24, as shown in FIGS. 2B and 2C. Lip portion 24 may fit snugly over a base plate, such as base plate 10, to hold print jig 20 in place.

Figure 3A:
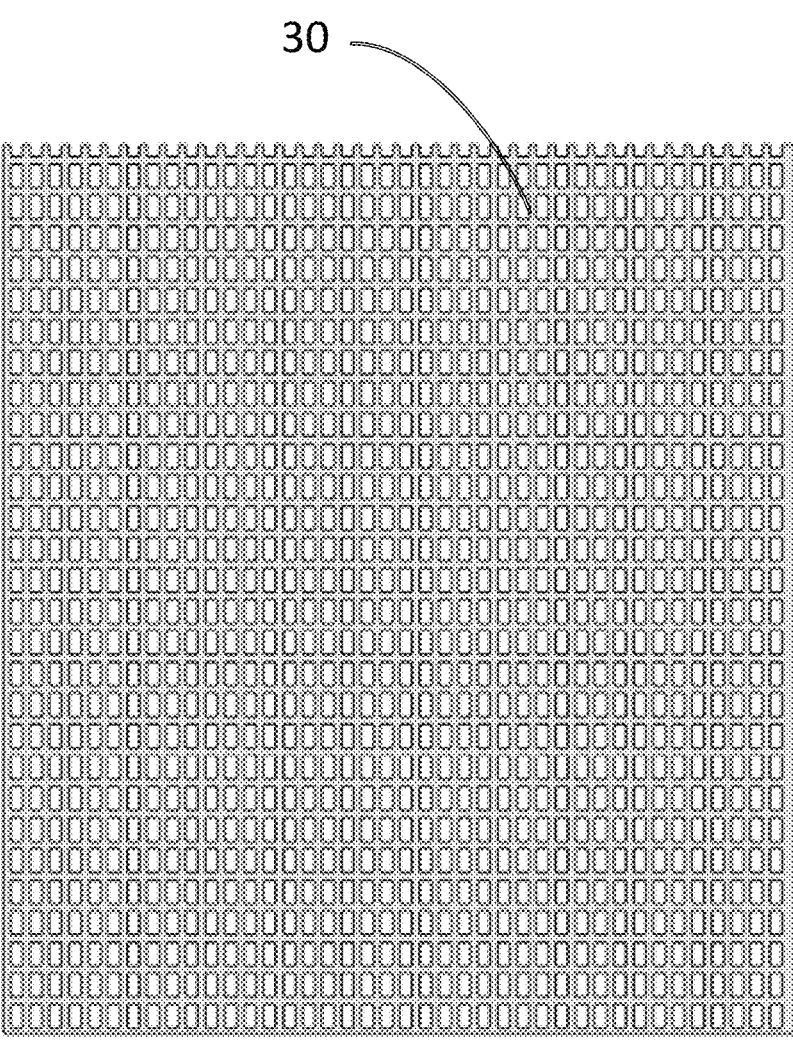
FIG. 3A shows a top view of a grip pad 30 according to at least one embodiment of the disclosure.
Figure 3B:
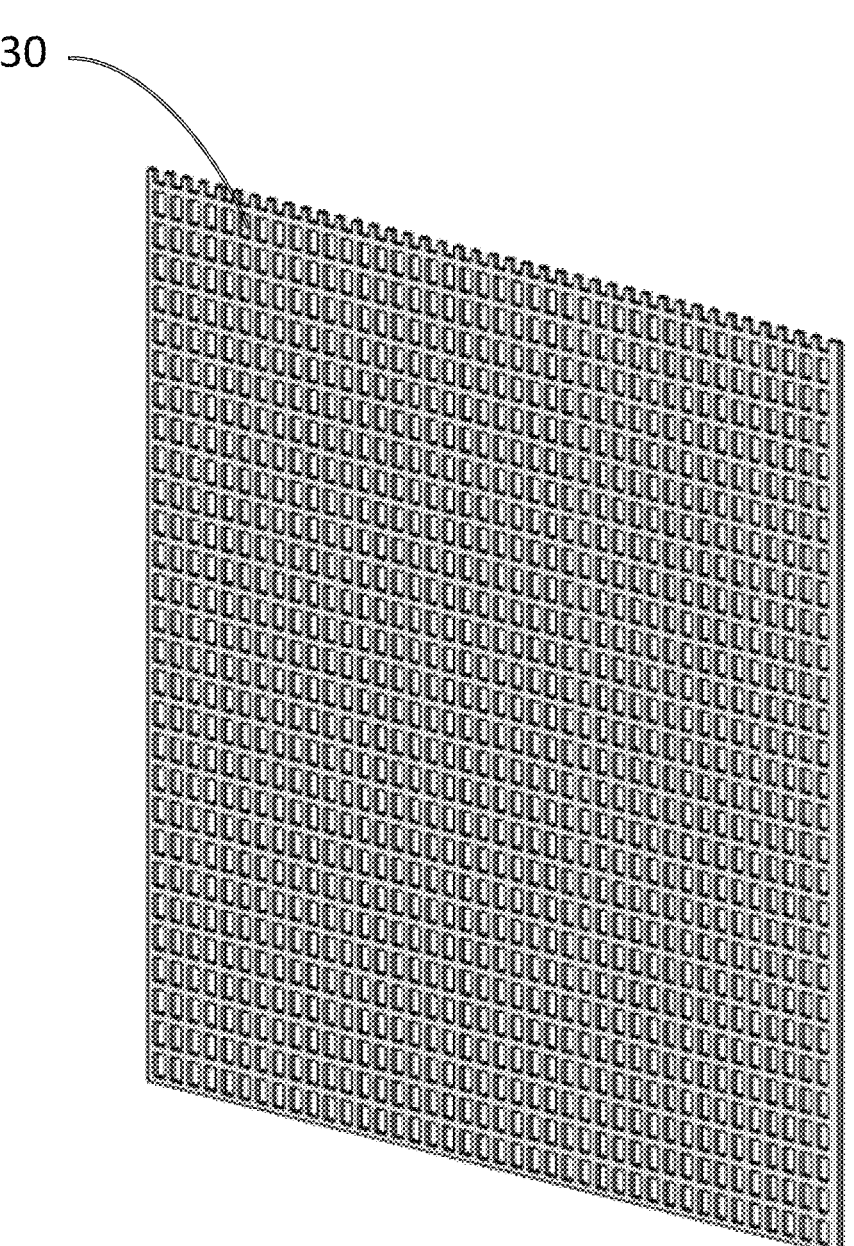
FIG. 3B shows a perspective view of a grip pad 30 according to at least one embodiment of the disclosure.

FIGS. 3A and 3B illustrate multiple views of a grip pad 30. Grip pad 30 may be a grip plate used to prevent food products from slipping. The grip pad 30, for example, may be used with or without a print jig, such as print jig 20. Grip pad 30 provides a food grip surface that is comprised of reusable, washable, and food grade materials.

Figure 4A:
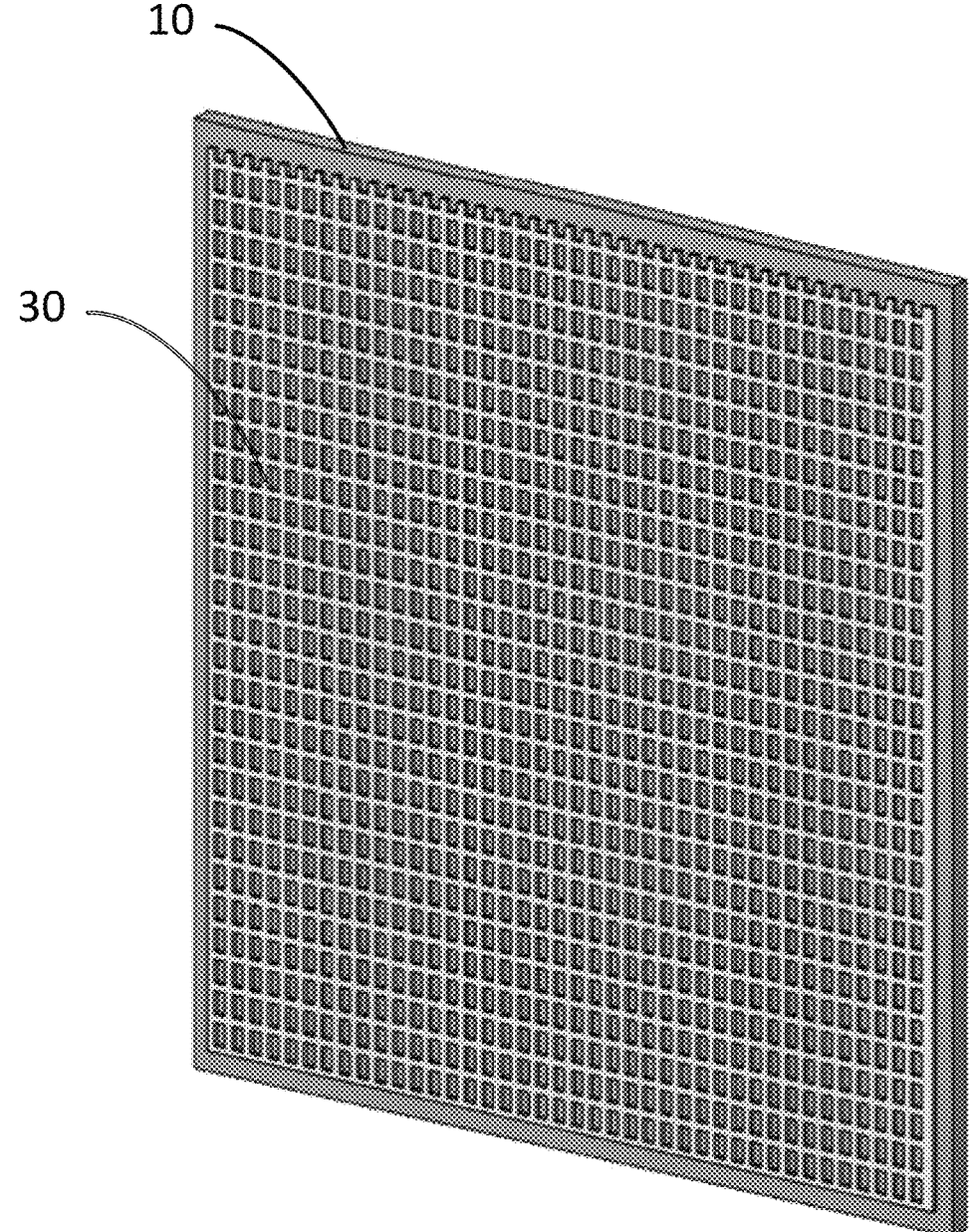
FIG. 4A shows a perspective view of a grip pad 30 on base plate 10 according to at least one embodiment of the disclosure.
Figure 4B:
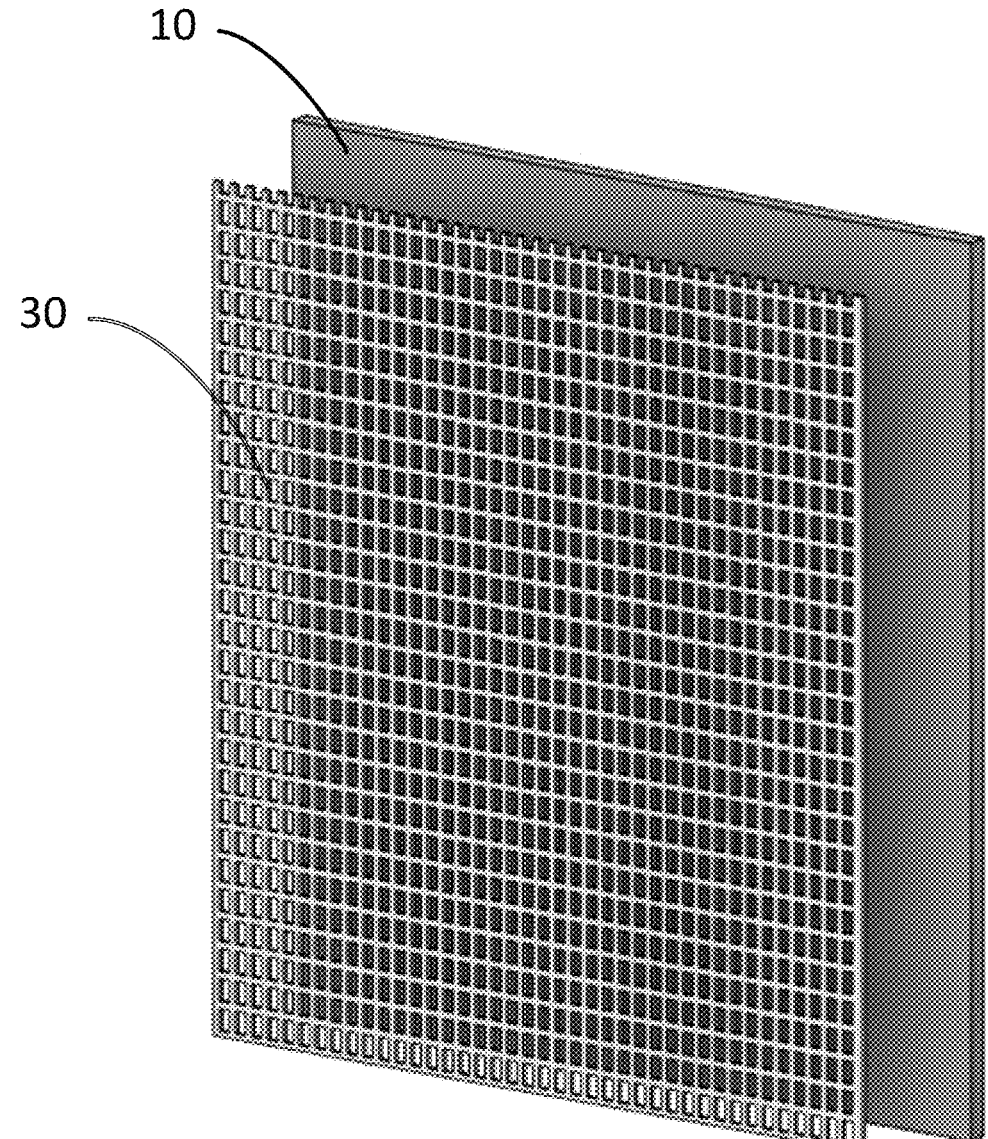
FIG. 4B shows an expanded view of a grip pad 30 and base plate 10 according to at least one embodiment of the disclosure.

FIGS. 4A and 4B illustrate multiple views of base plate 10 and grip pad 30. In some embodiments, grip pad 30 may fit directly onto base plate 10. Grip pad 30, as described above, prevents slippage of food product items to be printed on.

Figure 5A:
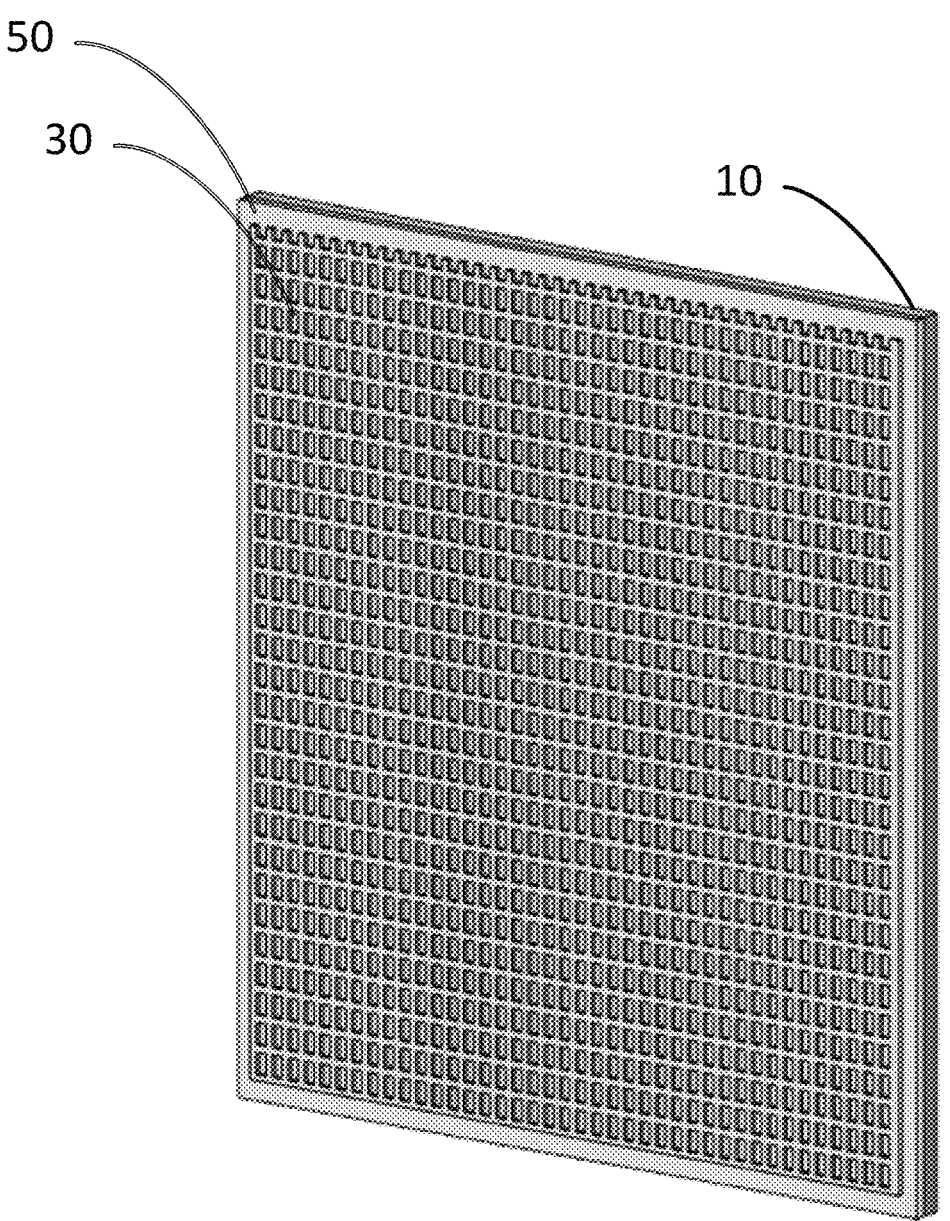
FIG. 5A shows a perspective view of a grip pad 30, paper plate 50, and base plate 10 according to at least one embodiment of the disclosure.
Figure 5B:
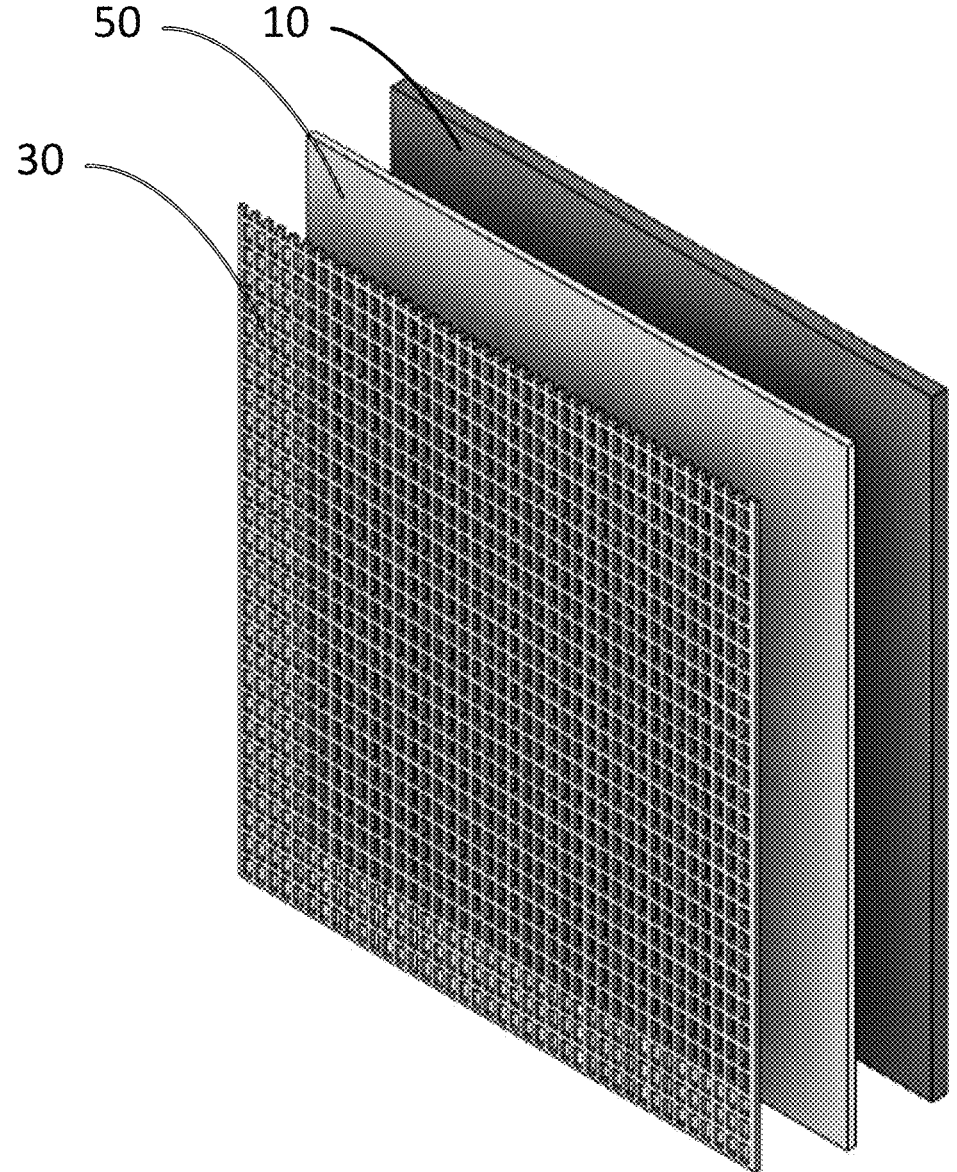
FIG. 5B shows an expanded view of a grip pad 30, paper plate 50, and base plate 10 according to at least one embodiment of the disclosure.

FIGS. 5A and 5B illustrate multiple views of base plate 10, grip pad 30, and a paper plate 50. Paper plate 50 may be provided as part of the jig assembly. Paper plate 50 attaches to base plate 10 via a resin surface on the back of the paper plate. Paper plate 50 may be printed on directly by an edible ink printer. In some embodiments, paper plate 50 may be used as a practice surface. The practice surface may comprise of reusable, washable, and food grade materials.

Figure 6A:
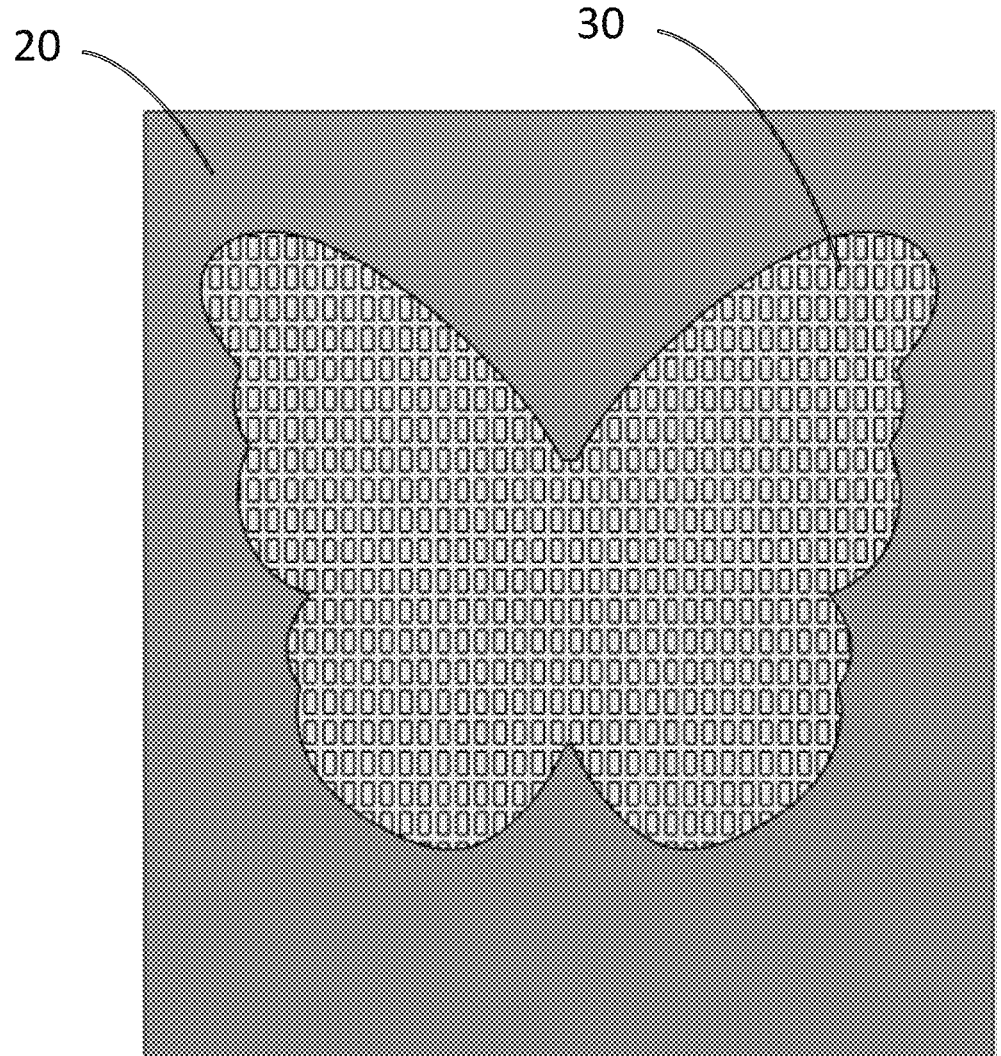
FIG. 6A shows a top view of a jig assembly according to at least one embodiment of the disclosure.
Figure 6B:
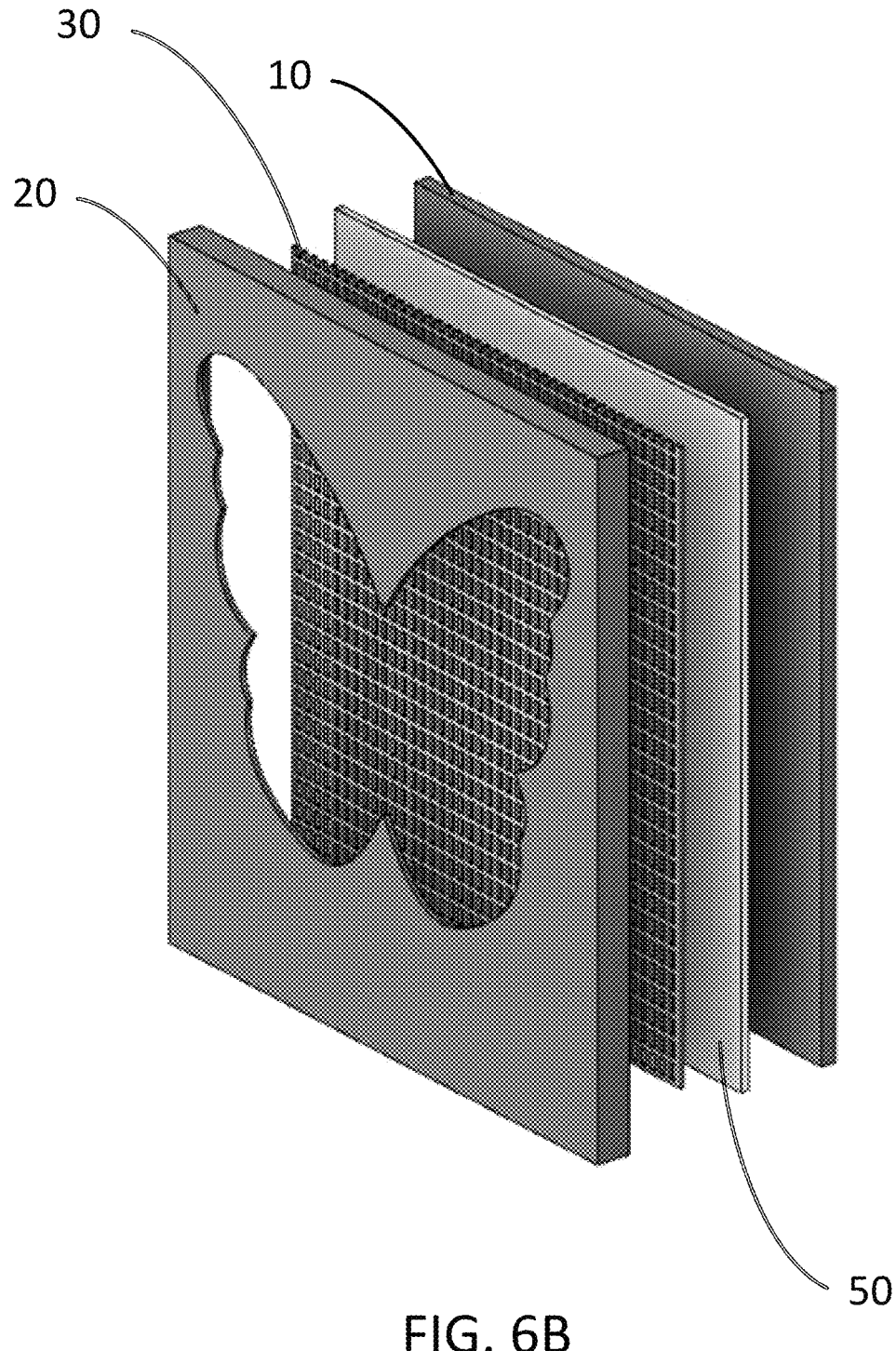
FIG. 6B shows an expanded view of a jig assembly according to at least one embodiment of the disclosure.

FIGS. 6A and 6B illustrate multiple views of the jig assembly, including base plate 10, paper plate 50, grip pad 30, and print jig 20. FIG. 6A illustrates a front view of the jig assembly where the cutout portion takes on the shape of a butterfly. As shown in FIG. 6B, portions of the jig assembly are shown in an expanded view to illustrate the layers (e.g., print jig 20, grip mesh 30, paper plate 50, and base 10). In some embodiments, some layers of the jig assembly may be optional. For example, grip pad 30 and paper plate 50 may be considered optional layers.

Figure 7A:
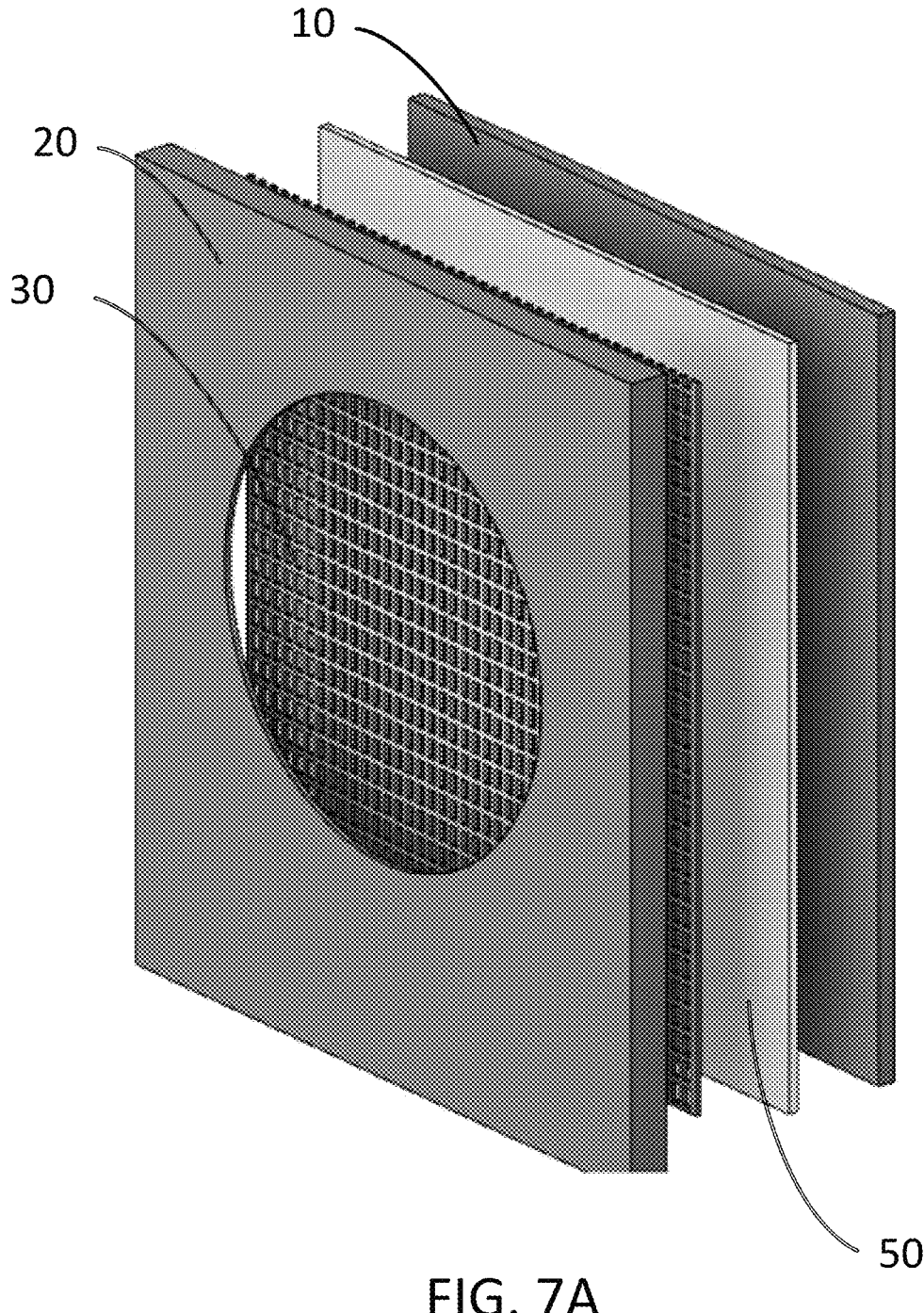
FIG. 7A shows another expanded view of a jig assembly according to at least one embodiment of the disclosure.
Figure 7B:
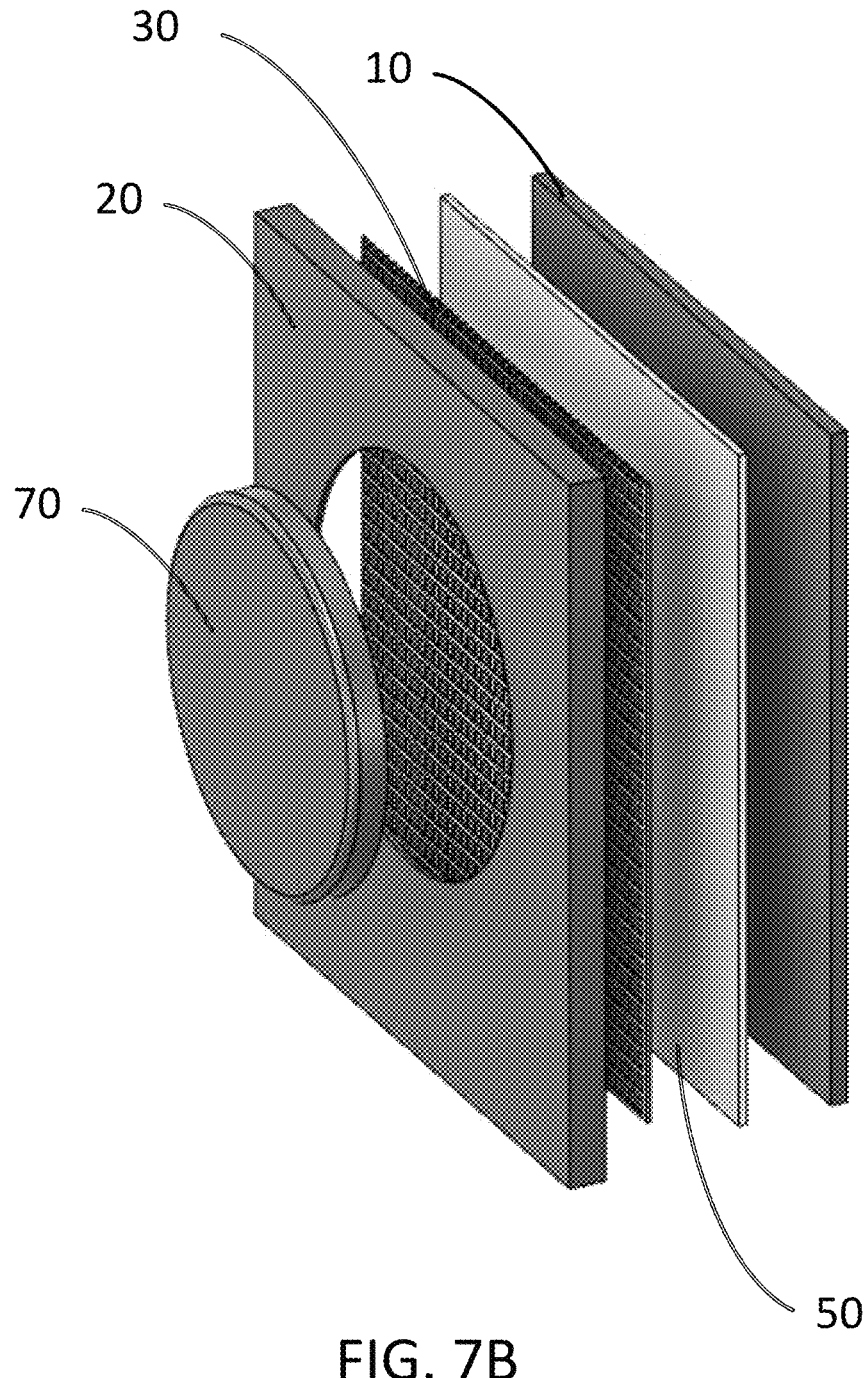
FIG. 7B shows yet another expanded view of a jig assembly according to at least one embodiment of the disclosure.

FIG. 7A illustrates another example embodiment of an expanded view of the jig assembly, including base plate 10, paper plate 50, grip pad 30, and print jig 20. As shown in FIG. 7A, cutout portion of print jig 20 is shown having a different shape (e.g., a circle). FIG. 7B illustrates an expanded view of the jig assembly, including base plate 10, paper plate 50, grip pad 30, print jig 20, and practice cookie 70. A practice cookie (e.g., a PhoDough cookie) may be provided for placement within the print jig 20. Practice cookie 70 may be comprised of reusable and washable materials. Practice cookie 70 will typically be shaped to correspond to the print jig it is being used with by an operator. The operator may use the practice cookie 70 to practice and test their printer. For example, the operator may use the practice cookie 70 to configure their edible ink printer. In some embodiments, the operator may use the practice cookie 70 to experiment with different designs.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a confectionary market, embodiments of the present disclosure can be implemented for other markets. The print jig assembly of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A jig assembly, comprising:
   a first layer including a base plate with a top portion having a planar surface and a bottom portion having a tongue adapter for connecting to a platform of an edible ink printer;
   a second layer including a paper plate with a top portion having a planar surface and a bottom portion having one or more adhesive materials for attaching the second layer to the first layer;
   a third layer including a grip pad with a mesh configuration, a top layer and a bottom layer for attaching the second layer to the third layer; and
   a fourth layer including a print jig with a cutout portion, the print jig having a lip, wherein the lip is configured to fit over the first, second, and third layers.

2. The jig assembly of claim 1, wherein the cutout portion of the print jig is configured to align a food product to be printed upon by the edible ink printer.

3. The jig assembly of claim 1, wherein the jig assembly is used to configure the edible ink printer.

4. The jig assembly of claim 1, wherein the one or more adhesive materials of the paper plate include a resin surface.

5. The jig assembly of claim 1, wherein the grip pad includes a food grip surface comprised of reusable, washable and food grade materials.

6. The jig assembly of claim 1, wherein the tongue adapter is shaped to attach to a cookie platform of the edible ink printer.

7. The jig assembly of claim 1, wherein the tongue adapter is shaped to attach to a carousel of the edible ink printer.

8. The jig assembly of claim 1, wherein the cutout portion of the print jig is between 2.5 inches and 3.5 inches, inclusive.

9. The jig assembly of claim 1, wherein the cutout portion of the print jig is based on a size of a food product.

10. The jig assembly of claim 1, wherein the cutout portion of the print jig has a shape that corresponds to a shape of a cookie cutter.

11. An assembly, comprising:
   a base plate including a top portion having a planar surface and a bottom portion;
   a tongue adapter protruding from the bottom portion of the base plate;
   a print jig including at least one cutout portion, the print jig having a lip configured to fit over the base plate;
   a paper plate between the base plate and the print jig; and
   a grip pad between the base plate and the print jig.

12. The assembly of claim 11, wherein the grip pad comprises a mesh configuration configured to prevent slippage of a food product.

13. The assembly of claim 11, wherein the tongue adapter is shaped to attach to a carousel of an edible ink printer.

14. The assembly of claim 11, wherein the tongue adapter is shaped to attach to a platform of an edible ink printer.

15. The assembly of claim 11, wherein the cutout portion of the print jig is between 2.5 inches and 3.5 inches, inclusive.

16. The assembly of claim 11, wherein the cutout portion of the print jig is based on a size of a food product.

17. The assembly of claim 11, wherein the cutout portion of the print jig has a shape that corresponds to a shape of a cookie cutter.

18. A cookie cutter alignment jig comprising:

a planar top surface and a bottom surface, wherein the planar top surface is configured to receive a paper plate and a print jig, the print jig having a cutout portion and the paper plate is positioned between the planar top surface and the print jig, wherein the bottom surface, with a protruding tongue adapter, is configured to connect to a portion of an edible ink printer.

* * * * *